(12) United States Patent
Coffey

(10) Patent No.: US 10,374,920 B2
(45) Date of Patent: Aug. 6, 2019

(54) COMMUNICATION MEDIA AND METHODS FOR PROVIDING INDICATION OF SIGNAL POWER TO A NETWORK ENTITY

(71) Applicant: CommScope Technologies LLC, Hickory, NC (US)

(72) Inventor: Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 266 days.

(21) Appl. No.: 15/277,721

(22) Filed: Sep. 27, 2016

(65) Prior Publication Data

US 2017/0104649 A1 Apr. 13, 2017

Related U.S. Application Data

(60) Provisional application No. 62/238,762, filed on Oct. 8, 2015.

(51) Int. Cl.
*H04L 12/24* (2006.01)
*H04L 12/26* (2006.01)
(Continued)

(52) U.S. Cl.
CPC .... *H04L 43/0811* (2013.01); *H04B 10/07955* (2013.01); *H04B 17/318* (2015.01); *H04L 41/0677* (2013.01); *H04L 43/16* (2013.01)

(58) Field of Classification Search
CPC ....... H04L 49/15; H04L 45/74; H04L 69/324; H04L 65/80; H04L 12/4641;
(Continued)

(56) References Cited

U.S. PATENT DOCUMENTS 8,596,882 B2 12/2013 Smrha et al.
8,665,107 B2 3/2014 Caveney et al.
(Continued)

FOREIGN PATENT DOCUMENTS

WO 2015013264 A1 1/2015
WO 2017062231 A1 4/2017

OTHER PUBLICATIONS

International Search Authority, "International Search Report for PCT/US2016/053989", "from U.S. Appl. No. 15/277,721", dated Jan. 5, 2017, pp. 1-12, Published in: WO.
(Continued)

*Primary Examiner* — Djenane M Bayard
(74) *Attorney, Agent, or Firm* — Fogg & Powers LLC

(57) ABSTRACT

Communication media for providing indication of signal power to a network entity include communication paths extending from a first end to a second end; and a connector assembly terminating the first end of the communication paths, the connector assembly including a physical layer management (PLM) interface that is isolated from signals on the communication paths. The connector assembly includes a signal sensor that senses signal power propagating through the connector assembly to/from the communication paths; a programmable processor coupled to the signal sensor and the PLM interface; and data storage devices that include first instructions that cause the programmable processor to receive a signal from the signal sensor corresponding to the signal power detected by the signal sensor, and to send an indication of the signal power propagating through the connector assembly, the programmable processor sending the indication over the PLM interface to a network entity.

33 Claims, 8 Drawing Sheets

(51) Int. Cl.
*H04B 10/079* (2013.01)
*H04B 17/318* (2015.01)

(58) Field of Classification Search
CPC ... H04L 9/0662; H04L 65/4076; H04L 67/16; H04L 41/12; H04L 41/22; H04L 41/24; H04L 41/26; H04L 45/66; H04L 49/351; H04L 69/326; H04L 12/18; H04L 29/06; H04L 29/08; H04L 69/22; H04L 65/608; H04L 67/02; H04L 1/0071; H04L 27/2602; H04L 27/2608; H04L 5/0091; H04L 65/1066; H04L 65/607; H04L 69/323; H04L 12/1881; H04L 12/4633; H04L 1/00; H04L 25/03057
See application file for complete search history.

(56) References Cited

U.S. PATENT DOCUMENTS

| | | | |
|---|---|---|---|
| 8,690,593 B2 | 4/2014 | Anderson et al. | |
| 8,832,503 B2 | 9/2014 | Anne et al. | |
| 8,842,445 B2 | 9/2014 | Anderson et al. | |
| 8,923,013 B2 | 12/2014 | Anderson et al. | |
| 8,934,252 B2 | 1/2015 | Anderson et al. | |
| 8,949,496 B2 | 2/2015 | Anne et al. | |
| 8,982,715 B2 | 3/2015 | Raza et al. | |
| 8,992,260 B2 | 3/2015 | Coffey et al. | |
| 9,020,319 B2 | 4/2015 | Anderson et al. | |
| 9,054,440 B2 | 6/2015 | Taylor et al. | |
| 9,065,658 B2 | 6/2015 | Caveney et al. | |
| 9,081,537 B2 | 7/2015 | Sybesma et al. | |
| 9,106,064 B2 | 8/2015 | Anderson et al. | |
| 9,140,859 B2 | 9/2015 | Anderson et al. | |
| 9,198,320 B2 | 11/2015 | Anderson et al. | |
| 9,401,552 B2 | 7/2016 | Coffey et al. | |
| 9,417,399 B2 | 8/2016 | Anderson et al. | |
| 9,491,119 B2 | 11/2016 | Raza et al. | |
| 9,497,098 B2 | 11/2016 | Sybesma et al. | |
| 9,549,484 B2 | 1/2017 | Anderson et al. | |
| 9,595,797 B2 | 3/2017 | Taylor et al. | |
| 9,674,115 B2 | 6/2017 | Raza et al. | |
| 9,684,134 B2 | 6/2017 | Anderson et al. | |
| 9,742,496 B2 | 8/2017 | Coffey | |
| 9,804,337 B2 | 10/2017 | Anderson et al. | |
| 2010/0211664 A1* | 8/2010 | Raza | H01R 13/6658 709/223 |
| 2010/0211697 A1 | 8/2010 | Raza et al. | |
| 2011/0116748 A1 | 5/2011 | Smrha et al. | |
| 2011/0262077 A1 | 10/2011 | Anderson et al. | |
| 2011/0267794 A1 | 11/2011 | Anderson et al. | |
| 2012/0133510 A1 | 5/2012 | Pierce et al. | |
| 2012/0246347 A1 | 9/2012 | Sybesma et al. | |
| 2013/0205579 A1 | 8/2013 | Mather et al. | |
| 2013/0343764 A1 | 12/2013 | Coffey et al. | |
| 2014/0016930 A1 | 1/2014 | Smith et al. | |
| 2014/0019662 A1 | 1/2014 | Coffey | |
| 2015/0086211 A1 | 3/2015 | Coffey et al. | |
| 2015/0103714 A1* | 4/2015 | Lee | H04W 52/0222 370/311 |
| 2016/0097801 A1 | 4/2016 | Polland et al. | |
| 2016/0283434 A1* | 9/2016 | Ranganathan | G06F 13/4291 |
| 2017/0063664 A1 | 3/2017 | Sybesma et al. | |
| 2017/0308155 A1* | 10/2017 | Lu | G06F 1/3215 |

OTHER PUBLICATIONS

European Patent Office, "Extended European Search Report from EP Application No. 16854097.9 dated Mar. 19, 2019", from Foreign Counterpart to U.S. Appl. No. 15/277,721, pp. 1-8, Published: EP.

* cited by examiner

COMMUNICATION MEDIA AND METHODS FOR PROVIDING INDICATION OF SIGNAL POWER TO A NETWORK ENTITY

CROSS-REFERENCE TO RELATED APPLICATION

This application claims the benefit of U.S. Provisional Patent Application Ser. No. 62/238,762, filed on Oct. 8, 2015, which is hereby incorporated herein by reference.

BACKGROUND

Physical communication media (also referred to herein as simply "communication media" or "cable assembly") include a cable having one or more connectors for connecting the communication media to one or more network entities. Such a network entity includes one or more mating connectors (e.g., jacks) for receiving a connector of the communication media.

Physical layer management (PLM) systems are systems designed to track connections between such communication media and a network entity, to provide network wide visibility to the physical layer connections of a managed network. Conventional PLM systems, however, do not have visibility to the signals propagating through the physical communication media. Thus, even though such a conventional PLM system can monitor which communication media is connected to which port of a network entity, such a conventional PLM system cannot easily determine whether the communication link over the communication media is operating properly. For example, a damaged (e.g., broken or cut) or otherwise defective communication media may prevent signals from propagating properly from one end of the communication media to the other. If both ends of such a defective communication media are connected to respective ports of respective network entities, the conventional PLM system may assume that the communication link is operating properly even though signals are not being sent properly between the respective ports.

Some existing optical communication media include a sensor within a connector of the communication media which can sense optical signals propagating through the connector of the communication media. Some such communication media also includes one or more LEDs on the connector which can be illuminated based on signals from the sensor to provide a visual indication to a technician within sight of the connector as to whether signals are propagating through the communication media. Such a visual indication provides an individual cable-by-cable indication of signals propagating through a communication media. These visual indications, however, do not provide a good network wide visibility to the signals propagating through the communication media.

SUMMARY

Communication media and methods for providing indication of signal power to a network entity are provided. In certain embodiments, a communication media comprises one or more communication paths extending from a first end to a second end; and a first connector assembly terminating the first end of the one or more communication paths, the first connector assembly including a first physical layer management (PLM) interface that is isolated from signals on the one or more communication paths. Further, the first connector assembly includes a first signal sensor configured to sense signal power propagating through the first connector assembly to/from the one or more communication paths; a first programmable processor coupled to the first signal sensor and to the first PLM interface; and one or more first data storage devices, the one or more first data storage devices including first instructions which, when executed by the first programmable processor, cause the first programmable processor to receive a first signal from the first signal sensor corresponding to the signal power detected by the first signal sensor, and to send a first indication of the first signal power propagating through the first connector assembly, the first programmable processor configured to send the first indication over the first PLM interface to a first network entity.

DRAWINGS

Understanding that the drawings depict only examples and are not therefore to be considered limiting in scope, the examples will be described with additional specificity and detail through the use of the accompanying drawings.

In accordance with common practice, the various described features are not drawn to scale but are drawn to emphasize specific features relevant to the examples. Like reference numbers and designations in the various drawings indicate like elements.

DETAILED DESCRIPTION

Figure 1:
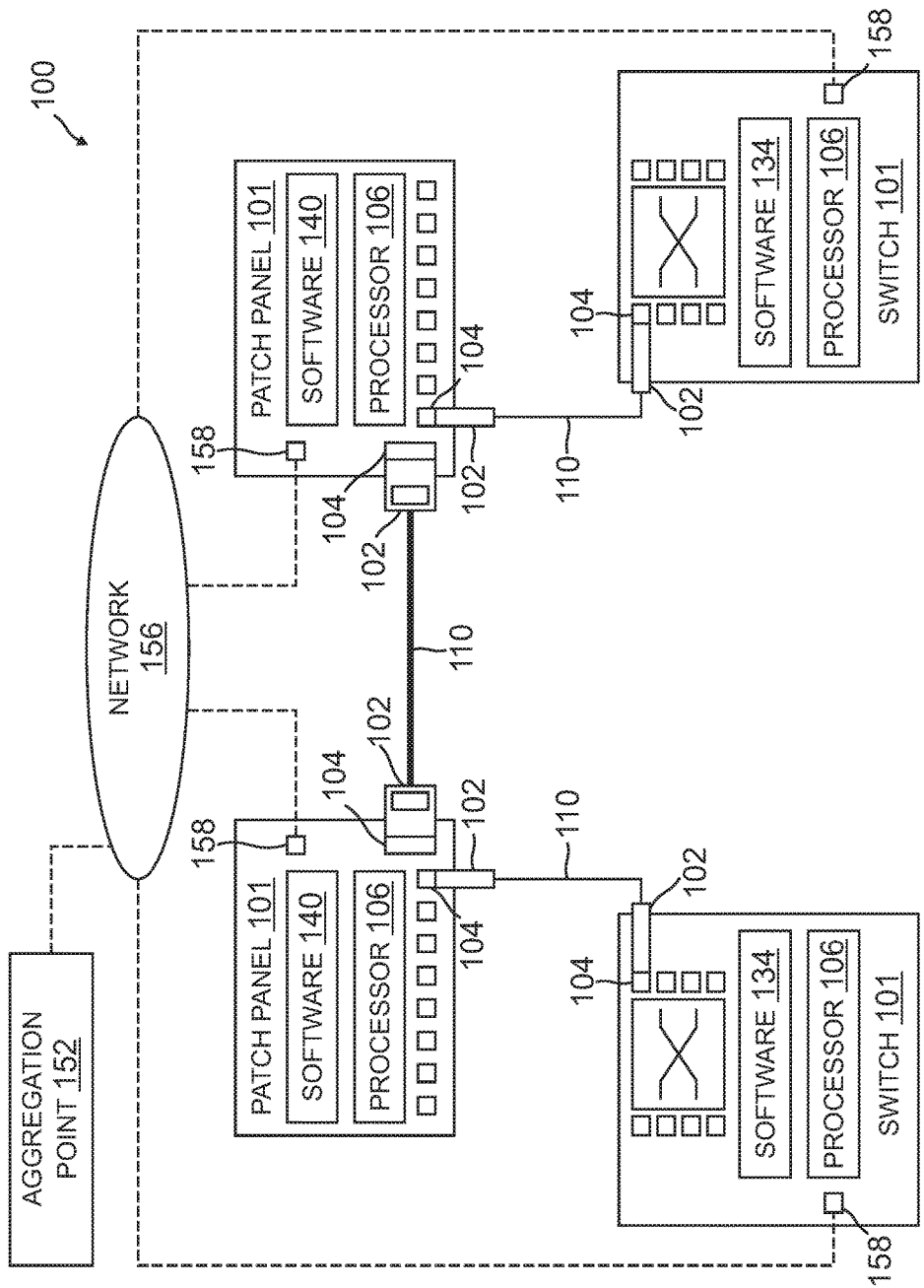
FIG. 1 is a block diagram of a system including physical communication media to provide an indication of a signal power propagating there through to a network entity according to at least one embodiment described herein.

FIG. 1 is a block diagram of an example of a system 100 including physical communication media 110 configured to provide an indication of a signal power propagating there through to a network entity. The system 100 comprises a plurality of network entities 101, where each network entity 101 comprises one or more ports 104. Physical communication media 110 are used to communicatively couple the network entities 101 to one another. The indications of signal power provided by the communication media 110 to the network entity 101 can be used to provide network wide visibility to the signals propagating through the communication media 110 in the network.

Each segment of physical communication media 110 in the network is attached to a respective port 104. Each port 104 is used to connect a segment of physical communication media 110 to the network entity 101 of which the port 104 is a part. Examples of network entities 101 include, for example, rack-mounted connector assemblies (such as patch panels, distribution units, and media converters for fiber and copper physical communication media), wall-mounted connector assemblies (such as boxes, jacks, outlets, and media converters for fiber and copper physical communication media), and inter-networking devices (such as a switch, router, hub, gateway, access point, server computer, end-user computer, appliance computer (such as network-attached storage (NAS) device), and nodes of a storage area network (SAN) or other types of devices). Signals coupled by communication media 110 to a port 104 can be received and processed by the network entity 101 (e.g., in an inter-networking device) or can be coupled to another port 104 and/or communication media 110 (e.g., in a rack-mounted connector assembly or wall-mounted connector assembly).

Each physical communication media 110 is a cable comprising one or more communication paths. The one or more communication paths can be formed by one or more fiber optics or one or more copper wires. As an example, the physical communication media 110 can be implemented using a simplex cable, a hybrid cable, a multi-channel cable, etc. Each physical communication media 110 includes a first connector 102 terminating a first end of the one or more communication paths and a second connector 102 terminating a second (opposite) end of the one or more communication paths. In examples where the one or more communication paths are fiber optics, the connectors 102 can be a corresponding passive optical connector or an active optical module for converting between optical signals and electrical signals. In examples where the one or more communication paths are copper wires, connectors 102 can be a corresponding electrical connector. As a cable, each physical communication media 110 is a connectorized media segment. As used herein, a "connectorized" media segment is a segment of physical communication media that includes a connector 102 at at least one end of the segment. The connectors 102 are used to facilitate the easy and repeated attachment and unattachment of the media segment 110 to a port 104.

Examples of connectorized media segments include CAT-5, 6, and 7 twisted-pair cables having modular connectors or plugs attached to both ends or optical cables having SC, LC, FC, LX.5, MTP, or MPO connectors. The techniques described here can be used with other types of connectors including, for example, BNC connectors, F connectors, DSX jacks and plugs, bantam jacks and plugs, and MPO and MTP multi-fiber connectors and adapters.

Example physical communication media 110 include duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables). Other example physical communication media 110 include coaxial cable. Still other examples include multiple-fiber cable including a multi-fiber connector (for example, a suitable MPO or MTP connector) at each end of such cable.

At least some of the network entities 101 are designed for use with segments of physical communication media 110 that have identifier and attribute information (also referred to herein as "PLM information") stored in or on them. The identifier and attribute information is stored in or on the segment of physical communication media 110 in a manner that enables the stored information, while the segment is attached to a port 104, to be read by a programmable processor 106 associated with the network entity 101. Examples of PLM information that can be stored in or on a segment of physical communication media 110 include, without limitation, an identifier that uniquely identifies that particular segment of physical communication media 110 (similar to an ETHERNET Media Access Control (MAC) address but associated with the physical communication media 110 and/or connector 102 attached to the physical communication media 110), a sub-identifier to identify the media end, or connector, a part number, a plug or other connector type, a cable or fiber type and length, a serial number, a cable polarity, a date of manufacture, a manufacturing lot number, information about one or more visual attributes of physical communication media 110 or a connector 102 attached to the physical communication media 110 (such as information about the color or shape of the physical communication media 110 or connector 102 or an image of the physical communication media 110 or connector 102), and other information used by an Enterprise Resource Planning (ERP) system or inventory control system. PLM information can also include testing or media quality or performance information which, for example, can be the results of testing that is performed when a particular segment of media 110 is manufactured. In other embodiments, alternate or additional data is stored in or on the media segments 110.

Also, as noted below, in some embodiments, the PLM information stored in or on the segment of physical communication media 110 can be updated. For example, the PLM information stored in or on the segment of physical communication media 110 can be updated to include the results of testing that is performed when a segment of physical media 110 is installed or otherwise checked. In another example, such testing information is supplied to an aggregation point 152 and stored in a data store maintained by the aggregation point 152. In another example, the PLM information stored in or on the segment of physical communication media 110 includes a count of the number of times that a connector 102 attached to a segment of physical communication media 110 has been inserted into port 104. In such an example, the count stored in or on the segment of physical communication media 110 is updated each time the connector 102 is inserted into port 104. This insertion count value can be used, for example, for warranty purposes (for example, to determine if the connector 102 has been inserted more than the number of times specified in the warranty) or for security purposes (for example, to detect unauthorized insertions of the physical communication media 110).

In the particular embodiment shown in FIG. 1, each of the ports 104 of the network entities 101 comprises a respective PLM interface via which the respective programmable processor 106 is able to determine if a physical communication media segment 110 is attached to that port 104 and, if one is, to read the identifier and attribute information (PLM information) stored in or on the attached segment (if such information is stored therein or thereon). The programmable processor 106 associated with each network entity 101 is communicatively coupled to each of the PLM interfaces using a suitable bus or other interconnect.

Each programmable processor 106 is configured to execute software or firmware 140 that causes the programmable processor 106 to carry out various functions described below. Each programmable processor 106 also includes suitable memory that is coupled to the programmable processor 106 for storing program instructions and data. In general, the programmable processor 106 determines if a physical communication media segment 110 is attached to a port 104 with which that processor 106 is associated and, if one is, to read the identifier and attribute information (PLM information) stored in or on the attached physical communication media segment 110 (if the segment 110 includes such information stored therein or thereon) using the associated PLM interface.

Each programmable processor 106 is also configured to communicate physical layer information to devices that are coupled to the IP network 156. A PLM system can utilize PLM information obtained from communication media 110 as well as other information. This other information along with the PLM information is encompassed herein by the term "physical layer information" (PLI). Physical layer information includes information about the network entities 101 associated with that programmable processor 106 (also referred to here as "device information") that is provided to a PLM system to manage the physical layer of the system. PLI also includes information about any segments of physical media 110 attached to the ports 104 of those network entities 101 ("PLM information"). Thus, device information and PLM information are subsets of the physical layer information (PLI). The device information includes, for example, an identifier for each network entity 101, a type identifier that identifies the network entity's type, and port priority information that associates a priority level with each port. The PLM information includes identity and attribute information that the programmable processor 106 has read from attached physical media segments 110 that have identifier and attribute information stored in or on it. The PLI may also include information about physical communication media 110 that does not have identifier or attribute information stored in or on it. This latter type of PLI can be manually input at the time the associated physical media segments 110 are attached to the network entity 101 (for example, using a management application executing on the programmable processor 106 that enables a user to configure and monitor the network entity 101).

The system 100 includes functionality that enables the physical layer information that the network entities 101 capture to be used by application-layer functionality outside of traditional physical-layer management application domain. That is, the physical layer information is not retained in a PLM "island" used only for PLM purposes but is instead made available to other applications. In the particular embodiment shown in FIG. 1, the system 100 includes an aggregation point 152 that is communicatively coupled to the network entities 101 via the IP network 156.

The aggregation point 152 includes functionality that obtains physical layer information from the network entities 101 (and other devices) and stores the physical layer information in a data store.

The aggregation point 152 can be used to receive physical layer information from various types of network entities 101 that have functionality for automatically reading information stored in or on the segment of physical communication media 110. Examples of such network entities 101 are noted above. Also, the aggregation point 152 and aggregation functionality can also be used to receive physical layer information from other types of devices that have functionality for automatically reading information stored in or on the segment of physical communication media 110. Examples of such devices include end-user devices—such as computers, peripherals (such as printers, copiers, storage devices, and scanners), and IP telephones—that include functionality for automatically reading information stored in or on the segment of physical communication media.

The aggregation point 152 can also be used to obtain other types of physical layer information. For example, in this embodiment, the aggregation point 152 also obtains information about physical communication media segments 110 that is not otherwise automatically communicated to an aggregation point 152. One example of such information is information about non-connectorized physical communication media segments that do not otherwise have information stored in or on them that are attached to a network entity (including, for example, information indicating which ports of the devices are connected to which ports of other devices in the network as well as media information about the segment). Another example of such information is information about physical communication media segments that are connected to devices that are not able to read media information that is stored in or on the media segments that are attached to their ports and/or that are not able to communicate such information to the aggregation point 152 (for example, because such devices do not include such functionality, because such devices are used with media segments that do not have media information stored in or on them, and/or because bandwidth is not available for communicating such information to the aggregation point 152). In this example, the information can include, for example, information about the devices themselves (such as the devices' MAC addresses and IP addresses if assigned to such devices), information indicating which ports of the devices are connected to which ports of other devices in the network (for example, other network entities), and information about the physical media attached to the ports of the devices. This information can be provided to the aggregation point 152, for example, by manually entering such information into a file (such as a spreadsheet) and then uploading the file to the aggregation point 152 (for example, using a web browser) in connection with the initial installation of each of the various items. Such information can also, for example, be directly entered using a user interface provided by the aggregation point 152 (for example, using a web browser).

The aggregation point 152 can also obtain information about the layout of the building or buildings in which the network is deployed, as well as information indicating where each network entity 101 and physical media segment 110 is located within the building. This information can be, for example, manually entered and verified (for example, using a web browser) in connection with the initial installation of each of the various items. In one implementation, such location information includes an X, Y, and Z location for each port or other termination point for each physical communication media segment (for example, X, Y, and Z location information of the type specified in the ANSI/TIA/EIA 606-A Standard (Administration Standard For The Commercial Telecommunications Infrastructure)).

The aggregation point 152 can obtain and maintain testing, media quality, or performance information relating to the various segments of physical communication media that exist in the network. The testing, media quality, or performance information, for example, can be results of testing that is performed when a particular segment of media is manufactured and/or when testing is performed when a particular segment of media is installed or otherwise checked.

The aggregation point 152 can include the functionality for managing the PLM network itself, or can be a local agent for a remotely located management system. The aggregation point 152 also includes functionality that provides an interface for external devices or entities to access the physical layer information maintained by the aggregation point 152.

This access can include retrieving information from the aggregation point 152 as well as supplying information to the aggregation point 152. In this embodiment, the aggregation point 152 is implemented as "middleware" that is able to provide such external devices and entities with transparent and convenient access to the PLI. Because the aggregation point 152 aggregates PLI from the relevant devices on the IP network 156 and provides external devices and entities with access to such PLI, the external devices and entities do not need to individually interact with all of the devices in the IP network 156 that provide PLI, nor do such devices need to have the capacity to respond to requests from such external devices and entities.

The aggregation point 152, in the embodiment shown in FIG. 1, implements an application programming interface (API) by which application-layer functionality can gain access to the physical layer information maintained by the aggregation point 152 using a software development kit (SDK) that describes and documents the API.

The IP network 156 is typically implemented using one or more inter-networking devices. As noted above, an inter-networking device is a type of network entity 101 and can be configured to read PLM information that is stored in or on the segments of physical media 110 that are attached to its ports and to communicate the PLM information it reads from the attached segments of media 110 (as well as information about the inter-networking device itself) to the aggregation point 152 like any other network entity 101 described here.

The aggregation point 152 can be implemented on a standalone network node (for example, a standalone computer running appropriate software) or can be integrated along with other network functionality (for example, integrated with an element management system or network management system or other network server or network element). Moreover, the functionality of the aggregation point 152 can be distribute across many nodes and devices in the network and/or implemented, for example, in a hierarchical manner (for example, with many levels of aggregation points).

Moreover, the aggregation point 152 and the network entities 101 are configured so that the aggregation point 152 can automatically discover and connect with the network entities 101 that provide PLI to an aggregation point 152 that are on the network 156. In this way, when network entities 101 that are able to provide PLI to an aggregation point 152 are coupled to the IP network 156, an aggregation point 152 is able to automatically discover the network entities 101 and start aggregating physical layer information for that network entity 101 without requiring the person installing the network entity 101 to have knowledge of the aggregation points 152 that are on the IP network 156. Similarly, when an aggregation point 152 is coupled to the IP network 156, the aggregation point 152 is able to automatically discover and interact with devices that are capable of providing PLI to an aggregation point without requiring the person installing the aggregation point 152 to have knowledge of the devices that are on the IP network 156. Thus, the physical-layer information resources described here can be easily integrated into the IP network 156.

In the example shown in FIG. 1, the programmable processors 106 in the network entities 101 are communicatively coupled to the network 156 by including a respective "management" or "non-service" port 158 that is separate from the "service" ports 104. However, one or more of the programmable processors 106 in the network entities 101 can be communicatively coupled to the network 156 using one or more of the "service" ports 104. In an example, the switches can communicate with the aggregation point 152 using a suitable communication protocol (such as the Simple Network Management Protocol (SNMP)).

The aggregation point 152 can aggregate the PLI from the network entities 101 and physical communication media to associate ports of network entities 101 (e.g., patch panels) with physical communication media. For example, the PLI can be used to associate a given port of a network entity with a given physical communication media and/or a particular connector of the physical communication media. Aggregating the PLI can include aggregating multiple such associations to determine physical layer connections between devices.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

The IP network 156 can include one or more local area networks and/or wide area networks (including, for example, the Internet). As a result, the aggregation point 152 need not be located at the same site as the network entities 101.

Various conventional IP networking techniques can be used in deploying the system 100 of FIG. 1. For example, conventional security protocols can be used to secure communications if they are communicated over a public or otherwise unsecure communication channel (such as the Internet or over a wireless communication link).

In one implementation of the embodiment shown in FIG. 1, each network entity 101, each port 104 of each network entity 101, and each media segment 110 is individually addressable. Where IP addresses are used to individually address each network entity 101, a virtual private network (VPN) dedicated for use with the various network entities 101 can be used to segregate the IP addresses used for the network entities 101 from the main IP address space that is used in the IP network 156.

In the particular embodiment shown in FIG. 1, the system 100 also supports conventional physical layer management (PLM) operations such as the tracking of moves, adds, and changes of the segments of physical media that are attached to the ports 104 of the network entities 101 and providing assistance with carrying out moves, adds, and changes. PLI provided by the aggregation point 152 can be used to improve upon conventional "guided MAC" processes. For example, information about the location of the port 104 and the visual appearance (for example, the color or shape) of the relevant physical media segment 110 (or connector 102 attached thereto) can be communicated to a technician to assist the technician in carrying out a move, add, or change. This information can be communicated to a computer or smartphone used by the technician. Moreover, the PLI functionality that resides in the system 100 can also be used to verify that a particular MAC was properly carried out by checking that the expected physical media segment is located in the expected port 104. If that is not the case, an alert can be sent to the technician so that the technician can correct the issue.

The PLM functionality included in the system 100 can also support conventional techniques for guiding the technician in carrying out a MAC (for example, by illuminating one or more light emitting diodes (LEDs) to direct a technician to a particular network entity 101 and/or to a particular port 104 or by displaying messages on a liquid crystal display (LCD) included on or near the network entity 101. Other PLM functions include keeping historical logs about the media 110 connected to the network entity 101.

In addition to network entities 101, the techniques described here for reading PLM information stored in or on a segment of physical communication media 110 can be used in one or more end nodes of the network. For example, computers (such as, laptops, servers, desktop computers, or special-purpose computing devices such as IP telephones, IP multi-media appliances, and storage devices) can be configured to read PLM information that is stored in or on the segments of physical communication media 110 that are attached to their ports and to communicate the media information read from the attached segments of media 110 (as well as information about the devices themselves) to an aggregation point 152 as described here.

Figure 2:
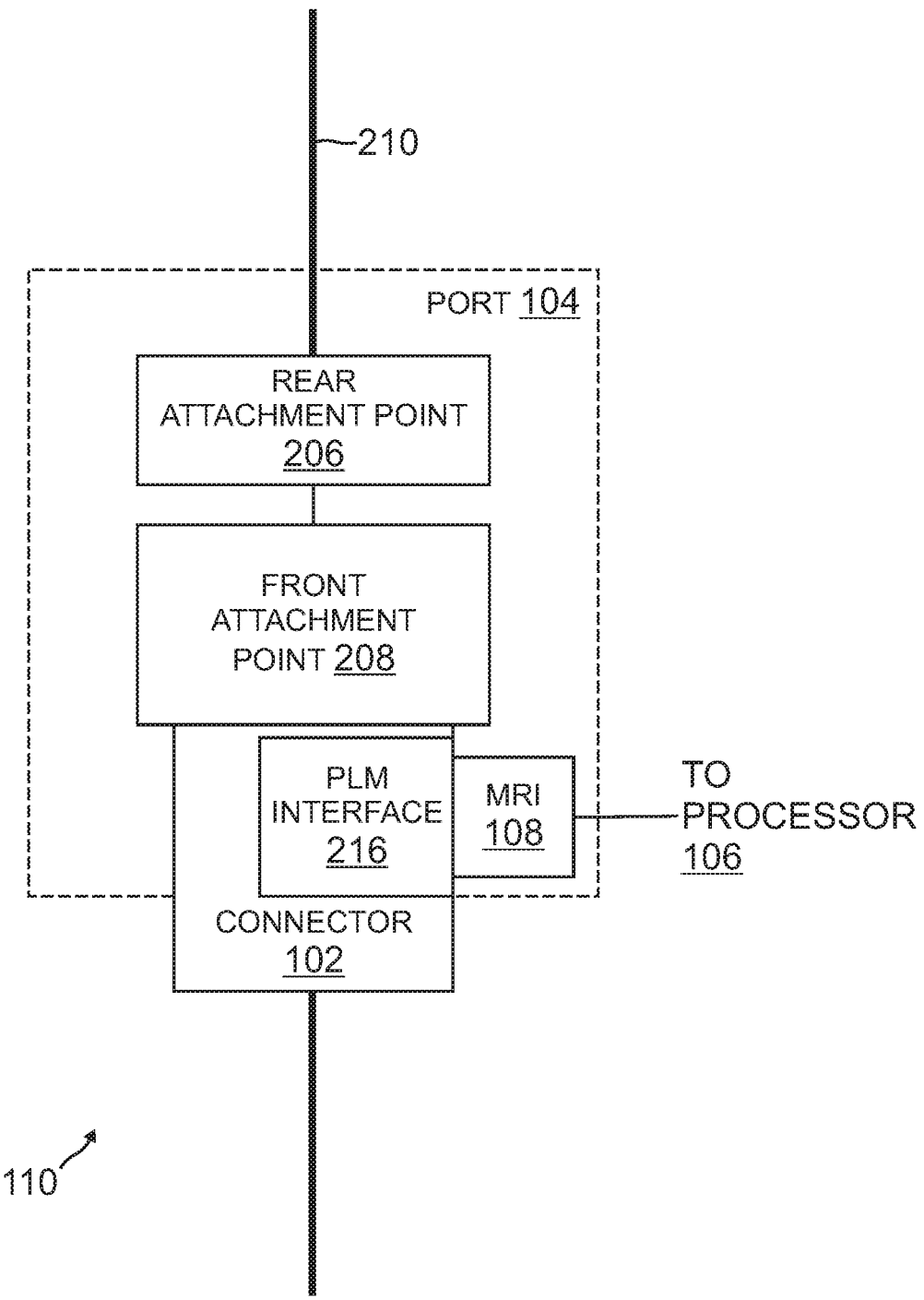
FIG. 2 is a block diagram of one high-level embodiment of a port having a connector of a communication media attached thereto.

FIG. 2 is a block diagram of one high-level embodiment of a port 104 having a connector 102 of a communication media 110 attached thereto.

Each port 104 comprises a first attachment point 206 and a second attachment point 208. The first attachment point 206 is used to attach one or more communication paths 210 to the port 104, and the second attachment point 208 is used to attach a segment of physical communication media 110 to the port 104. The one or more communication paths 210 can be part of a network entity 101 and connected to appropriate components within the network entity 101.

In the particular embodiment shown in FIG. 2, the first attachment point 206 is located near the rear of the port 104. As a consequence, the first attachment point 206 is also referred to here as the "rear attachment point" 206. Also, in this embodiment, the rear attachment point 206 is configured to attach the one or more communication paths 210 to the port 104 in a semi-permanent manner. As used herein, a semi-permanent attachment is one that is designed to be changed relatively infrequently, if ever. This is also referred to sometimes as a "one-time" connection. Examples of suitable rear connectors 206 include punch-down blocks (in the case of copper physical media) and fiber adapters, fiber splice points, and fiber termination points (in the case of optical physical media).

In the embodiment shown in FIG. 2, the second attachment point 208 is located near the front of the port 104. As a consequence, the second attachment point 208 is also referred to here as the "front attachment point" 208. In the embodiment shown in FIG. 2, the front attachment point 208 for each port 104 is designed for use with "connectorized" media segments 110 that have identifier and attribute information stored in or on them. The front attachment point 208 is implemented using a suitable connector or adapter that mates with the corresponding connector 102 on the end of the media segment 110. The connector 102 is used to facilitate the easy and repeated attachment and unattachment of the media segment 110 to the port 104. Examples of connectorized media segments include CAT-5, 6, and 7 twisted-pair cables having modular connectors or plugs attached to both ends (in which case, the front attachment point 208 is implemented using compatible modular jacks) or optical cables having SC, LC, FC, LX.5, MTP, or MPO connectors (in which case, the front attachment point 208 is implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Each port 104 communicatively couples the respective rear attachment point 206 to the respective front attachment point 208. As a result, one or more communication paths 210 attached to the respective rear attachment point 206 are communicatively coupled to any media segment 110 attached to the respective front attachment point 208. In one implementation, each port 104 is designed for use with one or more communication paths 110 and a media segment 110 that comprise the same type of communication path(s), in which case each port 104 communicatively couples the one or more communication paths 210 attached to the respective rear attachment point 206 to any media segment 110 attached to the respective front attachment point 208 at the physical layer level without any media conversion. In other implementations, each port 104 communicatively couples the one or more communication paths 210 attached to the respective rear attachment point 206 to any media segment 110 attached to the respective front attachment point 208 in other ways (for example, using a media converter if the rear one or more communication paths 210 and the media segment 110 comprise different types of communication paths).

As shown in FIG. 2, the port 104 is configured for use with media segments 110 that include a PLM interface 216 that, while the corresponding connector 214 is inserted into (or otherwise attached to) a front attachment point 208 of the port 104, communicatively couples a storage device or other component(s) associated with the media 110 to a corresponding PLM interface 108 of the network entity 101 of which the port 104 is a part. The PLM interface 108 of the network entity 101 is also referred to herein as a "media reading interface" 108. A programmable processor 106 associated with the network entity 101 can then obtain PLM information from the storage device or other component(s) associated with the media 110. In one implementation of the embodiment shown in FIG. 2, each connector 102 itself houses the storage device or other component(s) and the PLM interface 216 can be implemented by incorporating appropriate electrical contacts in the connector 102. In such an implementation, the media reading interface 108 can be implemented using appropriate mating electrical contacts in the port 104.

In another implementation of such an embodiment, the storage device and other component(s) are housed within a housing that is separate from the connector 102. In such an implementation, the housing is configured so that it can be snapped onto the media segment 110 or the connector 102, with the PLM interface 216 positioned relative to the connector 102 so that the PLM interface 216 will properly mate with the media reading interface 108 when the connector 102 is inserted into (or otherwise attached to) the front attachment point 208.

Various examples of PLM interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGA- TION OF PHYSICAL LAYER INFORMATION RELATED TO A NETWORK," all of which are hereby incorporated herein by reference. In some of these examples, a four-line PLM interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and PLM interface are the storage devices and interfaces used in the QUAREO™ family of physical layer management products that are commercially available from TE Connectivity.

In another example, the PLM interface and media reading interface can be implemented wirelessly. An implementation of such an example is a type of PLM technology that makes use of radio frequency identification (RFID) technology. An RFID tag is attached to or integrated with a connector on a cable, fiber, or other segment of communication media. That is, with this type of PLM technology, the PLM interface and media reading interface are implemented over a wireless link using the RFID tag and a corresponding RFID reader on the network entity. The RFID tag is used to store information about the connector or segment of communication media along with other information. The RFID tag can be read after the associated connector is inserted into a corresponding jack or other port of a network entity. In other implementations, other wireless links can be used. In this way, information about wired communication media, devices, systems, and/or networks can be transferred wirelessly between the communication media and the network entity.

Figure 3:
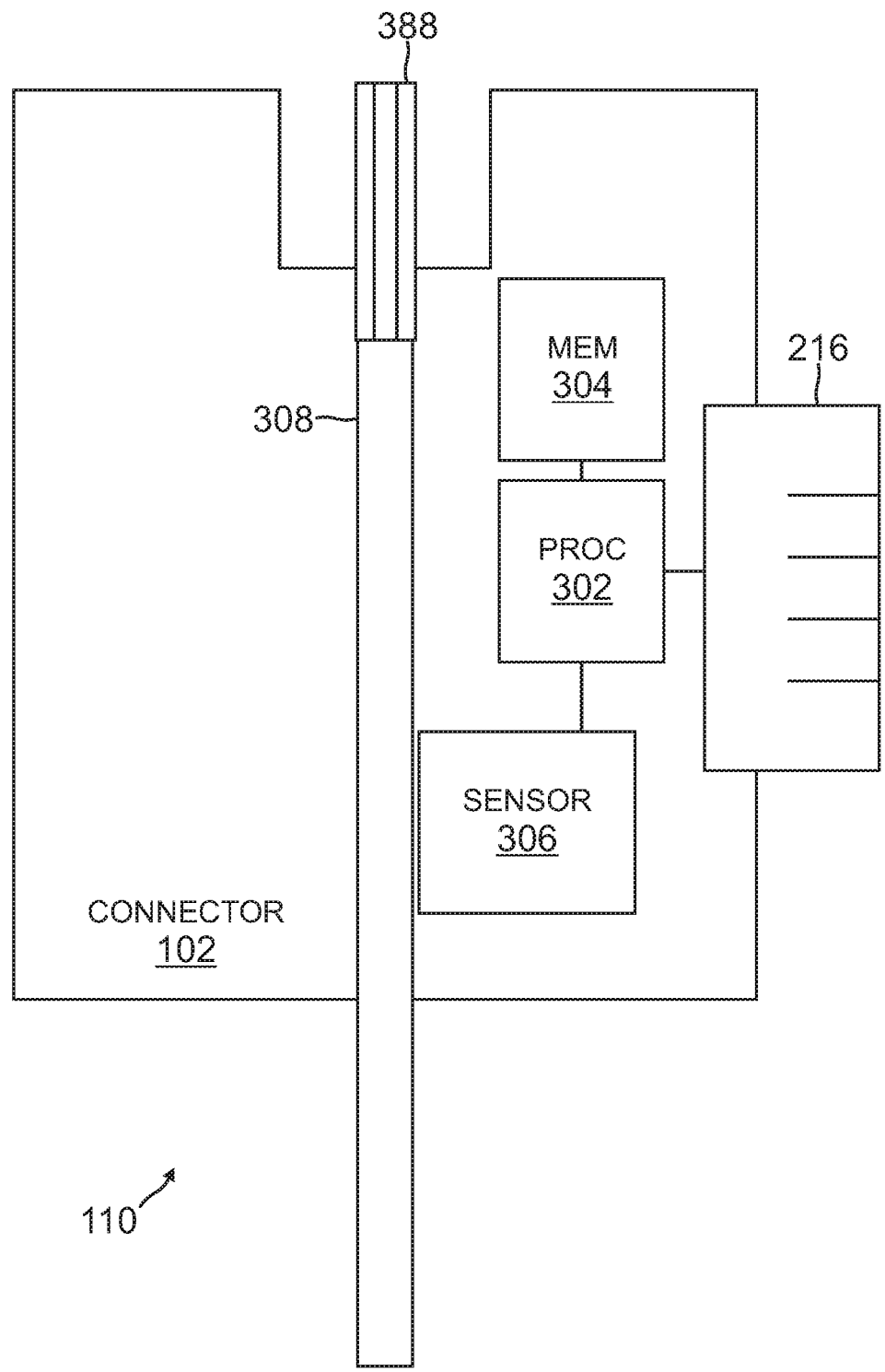
FIG. 3 is a diagram illustrating an example of one end of a communication media according to embodiments described herein.

FIG. 3 is a diagram illustrating an example of one end of a communication media 110 that is suitable for use in the system 100 of FIG. 1. In this example, the connector 102 is for optical communication media, which includes one or more fibers 308. The connector 102 includes a ferrule 388 that is aligned with a fiber 308 for coupling light into and out of the fiber 308, and for mating with an alignment sleeve of a port 104. The connector 102 also comprises (or is attached to) a programmable processor 302 that is coupled to a storage device 304. The programmable processor 302 can include any suitable programmable processor, such as a microprocessor. The storage device 304 can include, for example, an Electrically Erasable Programmable Read-Only Memory (EEPROM) or other non-volatile memory device. The programmable processor 302 and the storage device 304 can be on a single die, separate dies, or can be incorporated into a chip scale package. The PLM information described above for the communication media 110 is stored in the storage device 304. The storage device 304 includes sufficient storage capacity to store such information.

The programmable processor 302 can be configured to communicate with a network entity 101 over the PLM interface 216. The PLM interface 216, while the corresponding connector 102 is inserted into a front connector of a port 104, communicatively couples the programmable processor 302 to the corresponding media reading interface 108 so that the programmable processor 106 in the corresponding network entity 101 can communicate with the programmable processor 302.

The programmable processor 302 can be secured to restrict unauthorized access to the PLM information on the storage device 304. This can include restrictions on reading from the storage device 304, as well as restrictions on storing data to the storage device 304. In an example, access to the storage device 304 and/or firmware of the programmable processor 302 by an outside entity such as the programmable processor 106, can be subject to providing a security code. In some examples, the firmware of the programmable processor 302 can be configured to implement an encryption algorithm to encrypt information sent over the PLM interface 216. The programmable processor 106 on a corresponding network entity 101 can be configured to provide such a security code and to perform encrypted communications with the programmable processor 302 in order to support such secure operation. Some information on the storage device 216 can be non-secure and can be provided by the programmable processor 302 without a security code in an unencrypted form.

In an example, the programmable processor 302 is configured to communicate with external entities, such as programmable processor 106 using a bidirectional serial communication link using Manchester coding. In other examples, other communication schemes can be used.

The connector 102 also includes a signal sensor 306 configured to sense signal power propagating through a communication path of the media 110 of which the connector 102 is a part. In particular, the signal sensor 306 can be configured to sense signal power propagating along the communication paths through the connector 102. In an example, the processor 302, storage device 304, signal sensor 306, and PLM interface 216 are all embedded within the connector 102. A respective processor 302, storage device 304, signal sensor 306, and PLM interface 216 can be included in one or more (e.g., all) connectors of a communication media 110. For example, a first processor 302, first storage device 304, first signal sensor 306, and first PLM interface 216 can be included a first connector 102 at a first end of a communication media 110 and a second processor 302, second storage device 304, second signal sensor 306, and second PLM interface 216 can be included in a second connector 102 at a second end of the communication media 110.

In an optical communication media example such as that shown in FIG. 3, the signal sensor 306 is an optoelectronic sensor configured to sense light energy propagating along the communication paths of the media 110 and output an electrical signal indicative of the light energy. In the implementation shown in FIG. 3, the signal sensor 306 is configured to sense light energy propagating through a fiber 308 of the media 110. In some example, multiple sensors 306 can be included, one sensor 306 for each fiber 308 of the media 110. Although the example connector 102 for optical communication media 110 shown in FIG. 3 is a passive connector, active connectors which convert between and optical signal and an electrical signal can also be used. In examples in which light energy is sensed from multiple fibers 308 in a communication media 110, multiple signal sensors 306 can be used (e.g., one signal sensor 306 per fiber 308 being sensed).

In another example, media 110 can be a wired media including one or more wires configured to propagate radio frequency (RF) electromagnetic signals. Such wires can be composed of, for example, copper. In such an example, the signal sensor is an electromagnetic sensor configured to sense the RF electromagnetic energy propagating along the communication paths of the media 110. That is, the signal sensor is configured to sense the RF electromagnetic energy propagating through one or more of the wires of the communication media 110. In examples in which RF electromagnetic energy is sensed from multiple wires in a communication media 110, multiple signal sensors can be used (e.g., one signal sensor per wire being sensed).

Figure 4:
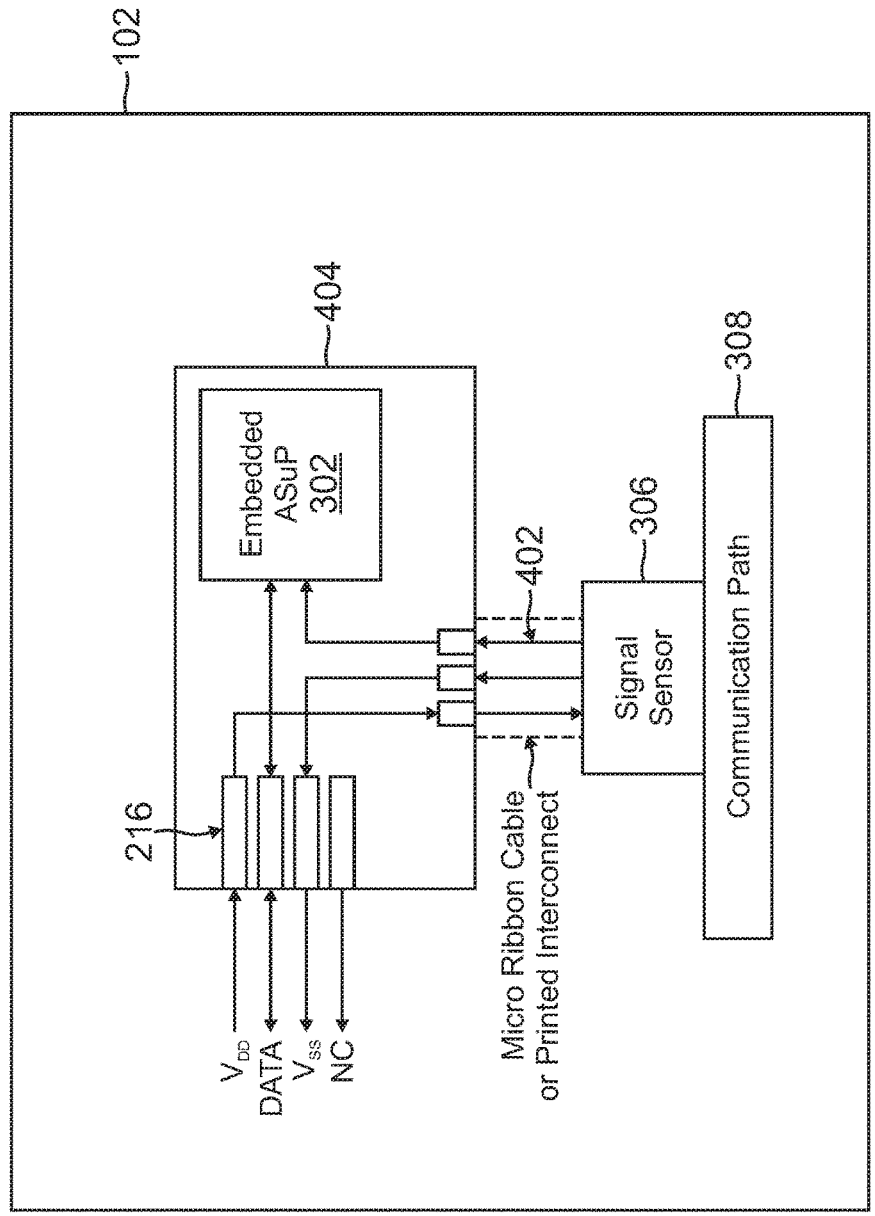
FIG. 4 is a block diagram of an example processor and signal sensor configuration for a connector according to embodiments described herein.

FIG. 4 is a block diagram of an example processor 302 and signal sensor 306 configuration for a connector 102. In this example, the PLM interface 216 of the connector 102 includes four contacts. The four-contact PLM interface includes a single data line for reading and writing data, a power line for providing power, a ground line for providing a ground level, and an extra line reserved for future use. Each of the four contacts of the PLM interface 216 contacts a corresponding contact on a media reading interface 108 (e.g., a four-contact media reading interface). In an implementation of this example, the UNI/O bus protocol is used for communicating over the single data lead. One example of such a four-contact PLM interface are the interfaces used in the QUAREO™ family of physical layer management products that are commercially available from TE Connectivity.

The signal sensor 306 in the connector 102 can be disposed in proximity to the fiber 308 or wire in which signal power is being sensed. In particular, the signal sensor 306 is disposed such that the communication signals (optical or RF) can be sensed by the signal sensor 306. In some examples, the fiber 308 and signal sensor 306 can be configured as described in International Patent Application Publication No. WO 2015/013264, filed on Jul. 22, 2014, titled "FIBER OPTIC CABLE AND CONNECTOR ASSEMBLY INCLUDING INTEGRATED ENHANCED FUNCTIONALITY"; and U.S. Patent Application Ser. No. 16/075,259, having a priority date of Feb. 4, 2016 and published as U.S. Patent Publication No. US 2019/0052357A1, titled "APPARATUS FOR MONITORING FIBER SIGNAL TRAFFIC AT A FIBER CONNECTOR", each of which are hereby incorporated herein by reference. The signal sensor 306 can be communicatively coupled to an input/output line of the processor 302 via signal lines 402 for communication of data from the sensor 306 to the processor 302 corresponding to signals sensed by the sensor 306. In some examples, the signal lines 402 can also be used to communicate commands from the processor 302 to the sensor 306 to control operation of the sensor 306. The communications between the processor 302 and the sensor 306 can be either analog or digital depending on the type of signals supported by the sensor 306.

The signal sensor 306 can also be coupled to the power (Vdd) and ground (Vss) contacts of the PLM interface 216 in order to receive operating power therefrom. The processor 302 can be coupled to the power (Vdd) and ground (Vss) contacts of the PLM interface 216 to receive operating power therefrom. Additionally, the processor 302 can be coupled to a data contact of the PLM interface 216 to communicate data to/from a network entity 101 over the PLM interface 216. In an example, the processor 302 can be configured to implement the UNI/O communication protocol over the data contact of the PLM interface 216. In this example, the processor 302 is a microcontroller having the storage device 304 integrated therein. Such a microcontroller can be an off-the-shelf microcontroller or a proprietary application specific microcontroller. In an example, the processor 302 emulates a storage device in communications over the PLM interface 216, such that a network entity 101 that is configured to read/write to a storage device through that entity's 101 media reading interface 108 can interact with the processor 302 as though the network entity 101 were interacting with a storage device. For example, the processor 302 can emulate the addressable space, read-write/read-only partitions, and Key, Length, Value (KLV) data structures that the network entity 101 is configured to access over its media reading interface 108. Examples of such storage device emulation are described in United States Patent Application Publication No. US 2013/0343764, filed on Jun. 25, 2013, titled "PHYSICAL LAYER MANAGEMENT FOR AN ACTIVE OPTICAL MODULE"; United States Patent Application Publication No. US 2015/0086211, filed on Sep. 23, 2014, titled "PLUGGABLE ACTIVE OPTICAL MODULE WITH MANAGED CONNECTIVITY SUPPORT AND SIMULATED MEMORY TABLE"; U.S. patent application Ser. No. 14/685,226, filed on Apr. 13, 2015, titled "SYSTEMS AND METHODS FOR CONNECTORS WITH INSERTION COUNTERS"; and U.S. Patent Application Ser. No. 62/167,421, filed on May 28, 2015, titled "PHYSICAL LAYER MANAGEMENT CONFIGURED ACTIVE OPTICAL MODULE WITH NATIVE AND NON-NATIVE NETWORK ELEMENT SUPPORT", each of which are hereby incorporated herein by reference.

In an example, the processor 302 and PLM interface 216 can be mounted on a substrate 404 (e.g., circuit board), and the signal sensor 306 can be mounted separately from the substrate 404. The signal lines 402, power, ground lines for the signal sensor 306 can be included within an appropriate physical communication medium such as a micro ribbon cable or printed interconnect that connects to appropriate contacts 406 on the substrate 404. The contacts 406 on the substrate 404 are connected to respective interconnects that are routed through the substrate 404 to couple to the appropriate item. In examples where the signal sensor 306 is sensing optical signals, the signal sensor 306 can comprise a PIN-TIA optoelectronic sensor.

Figure 5:
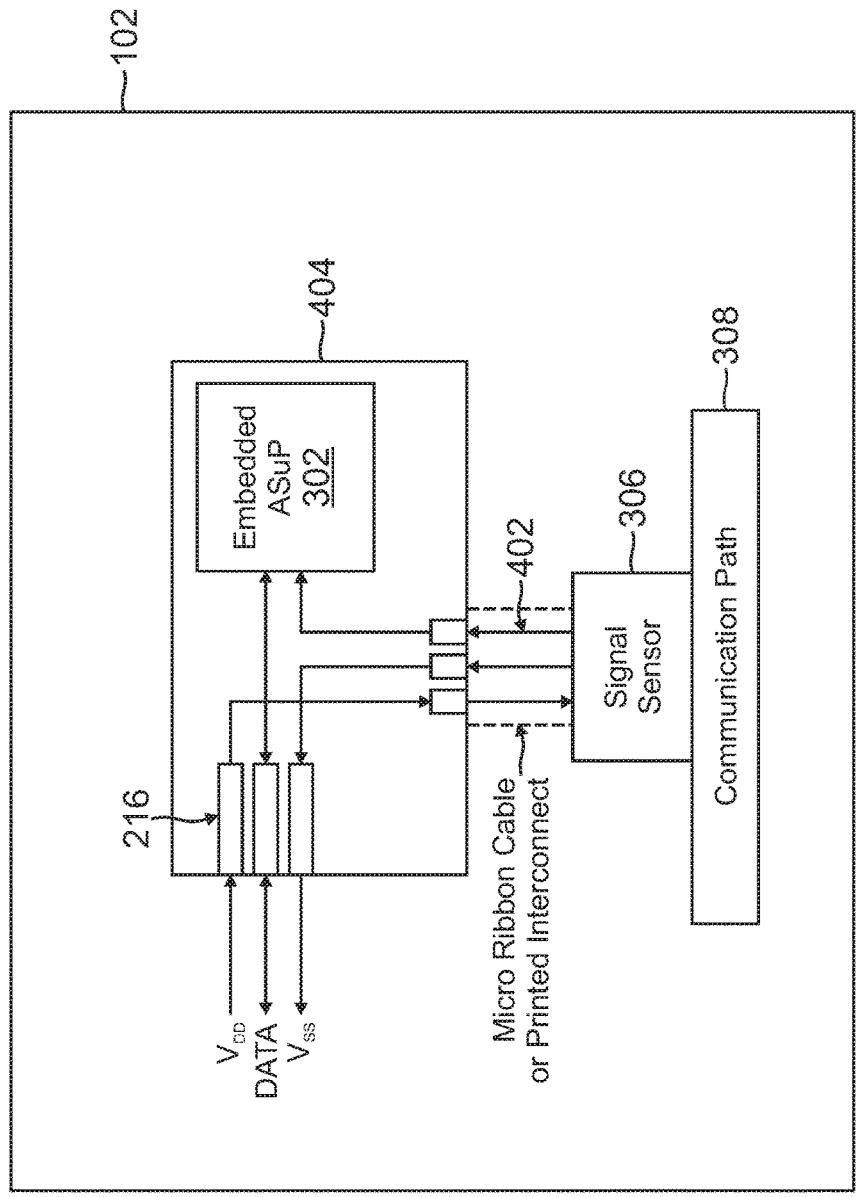
FIG. 5 is a block diagram of an example processor and signal sensor configuration for a connector according to additional embodiments described herein.

FIG. 5 is a block diagram of another example processor 302 and signal sensor 306 configuration for a connector 102. In this example, the PLM interface 216 of the connector 102 includes three contacts. The three-contact PLM interface includes a single data line for reading and writing data, a power line for providing power, a ground line for providing a ground level. The components in this three-contact configuration can be connected and can operate similar to the four-contact configuration described with respect to FIG. 4.

Figure 6:
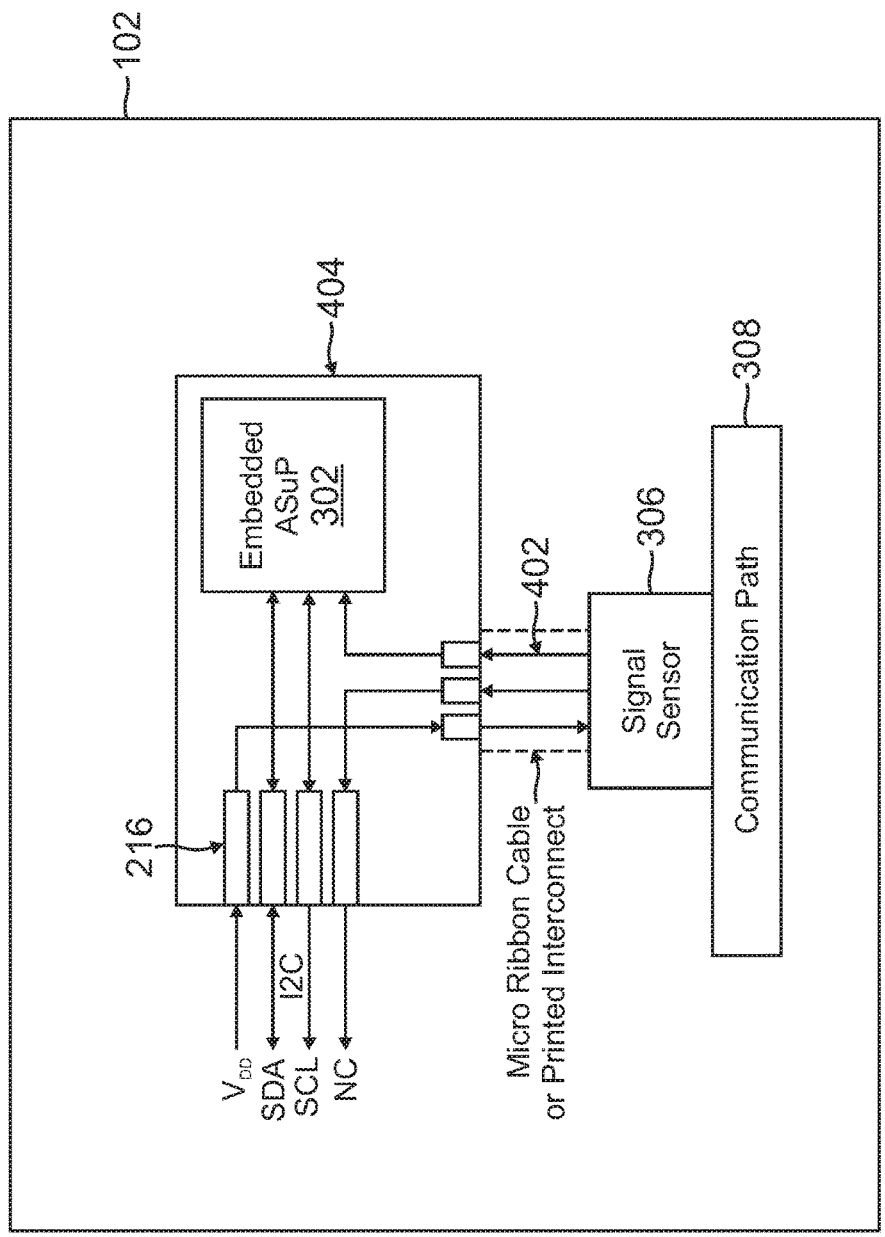
FIG. 6 is a block diagram of an example processor and signal sensor configuration for a connector according to further embodiments described herein.

FIG. 6 is a block diagram of yet another example processor 302 and signal sensor 306 configuration for a connector 102. In this example, the PLM interface 216 of the connector 102 includes four contacts, however, two contacts are used for data communication instead of a single contact as described with respect to FIG. 4. In this example, the four-contact PLM interface includes a bi-directional data line (SDA) for reading and writing data along with a uni-directional data line, a power line for providing power, and a ground line for providing a ground level. In an example, the processor 302 is configured to communicate using the I-squared-C (I2C) communication protocol over the bi-directional data line. The other components in this alternative four-contact configuration can be connected and can operate similar to the four-contact configuration described with respect to FIG. 4.

Figure 7:
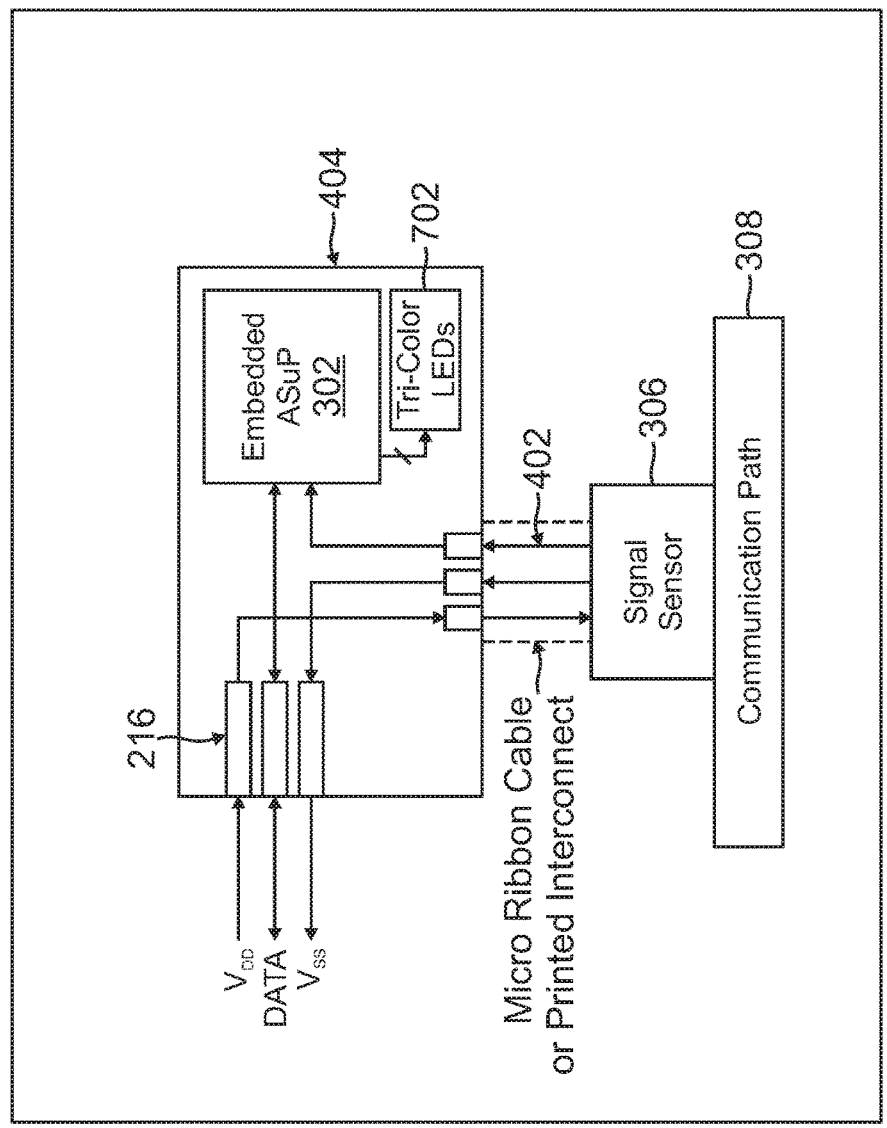
FIG. 7 is a block diagram of an exemplary configuration for a connector according to embodiments described herein.

FIG. 7 is a block diagram of yet another example configuration for a connector 102. In this configuration, the connector includes one or more LEDs 702 for providing visual indications to an operator in view of the connector 102. The one or more LEDs 702 can be embedded in the connector 102 in manner such that the one or more LEDs 702 are visible to a technician when the connector 102 is mated with a port 104. In an example, the one or more LEDs 702 include a tri-color LED. The one or more LEDs 702 are coupled to the processor 302, and the processor 302 is configured to provide signals to the one or more LEDs 702 to control the operation thereof. The processor 302 can control the operation of the one or more LEDs to provide visual indications to an operator in view of the connector 102 as to the signals propagating through the connector 102. For example, the processor 302 can use fuzzy logic control to indicate high power detected on the communication path (e.g., fiber 308) with a first color (e.g., green), indicate nominal power on the communication path with a second color (e.g., yellow), and indicate low power or simply any power detected by a third color (e.g., red). Any appropriate visual indication scheme including different colors and/or on/off pattern can be used. The one or more LEDs 702 can also be used as indicators to technicians to prevent them from removing a communication medium 110 that may be in service. Additionally, the one or more LEDs 702 can be used to indicate to a technician which cable is to be removed by showing a color and/or on/off pattern on the one or more LEDs 702 of the cable, wherein the color and/or on/off pattern is not used to indicate normal signal flow on the communication medium 110. The other components shown in FIG. 7 can be connected and operate similarly to the components discussed with respect to FIG. 5. In other examples, one or more LEDs 702 are included in the configurations shown in FIGS. 4 and 7 and are connected and operate similarly to that described above. In an example, the one or more LEDs can be controlled as described in U.S. Patent Application Ser. No. 16/075,259, having a priority date of Feb. 4, 2016 and published as U.S. Patent Publication No. US 2019/0052357A1, titled "APPARATUS FOR MONITORING FIBER SIGNAL TRAFFIC AT A FIBER CONNECTOR", which is hereby incorporated herein by reference.

Figure 8:
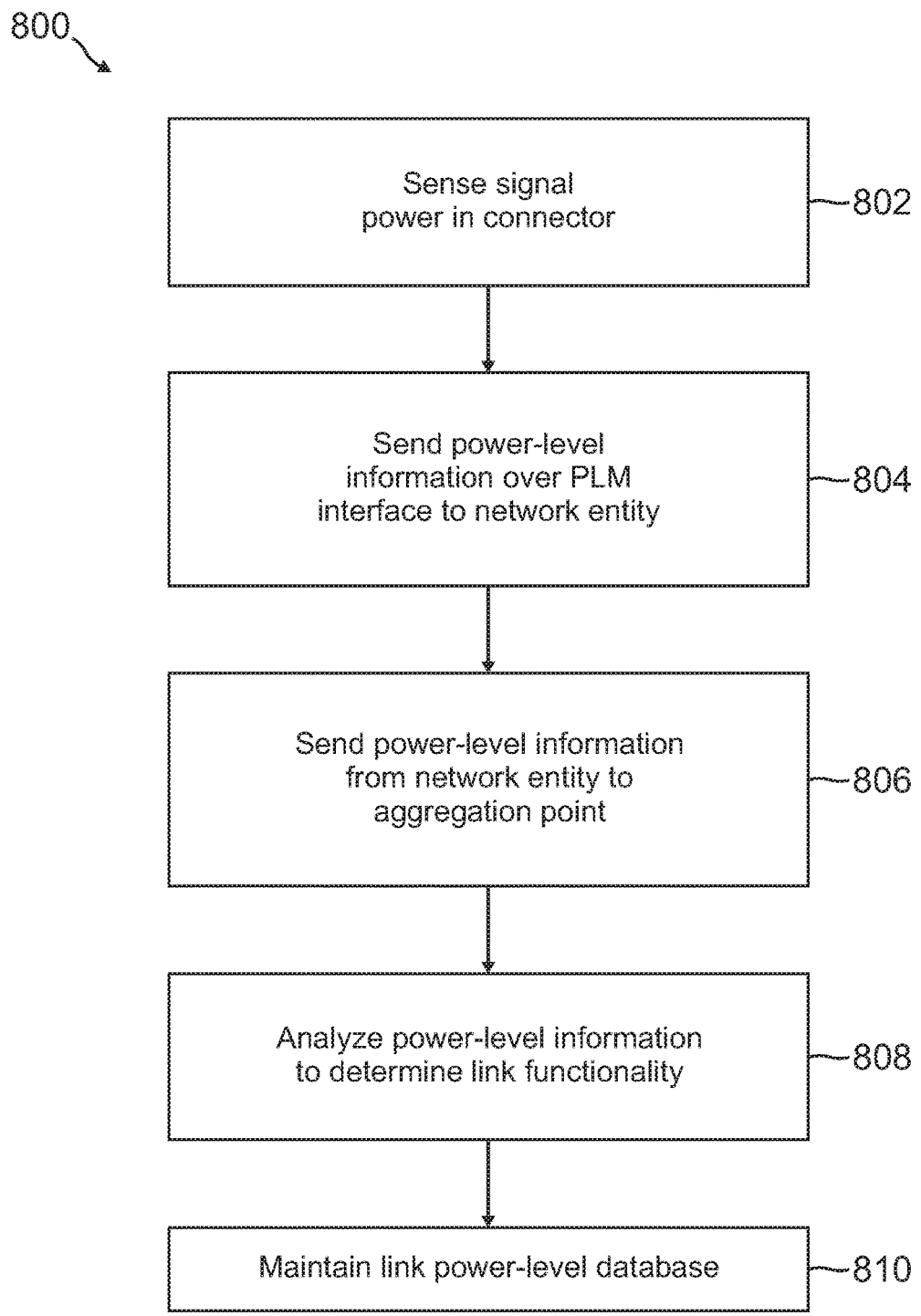
FIG. 8 is a flow diagram of an example method for monitoring signal power propagating through a communication medium according to embodiments described herein.

FIG. 8 is a flow diagram of an example method 800 of monitoring signal power propagating through a communication medium using any of the above configurations of a processor 302 and signal sensor 306 in a connector 102. In operation, the signal sensor 306 is configured sense signal power (e.g., optical power or RF power) present in the communication path (e.g., fiber 308) of a communication medium 110 (e.g., via a connector 102) (block 802).

In a first example, the signal sensor 306 is configured to sense whether or not signal power is present in the communication path at a level above a threshold. In such an example, the signal sensor 306 can send a signal to the processor 302 indicative of whether the signal power present in the communication path at that time is above the threshold or not. The threshold can be at a level such that the signal sensor 306 indicates generally whether or not a communication signal is present in the communication path.

In a second example, the signal sensor 306 is configured to sense multiple power-present power levels. As used herein a power-present power level is a power level that indicates that at least some power is present in the communication path. Thus, the signal sensor 306 senses signal power in the communication path and provides either an indication that the power level of the signal is below a minimum threshold (no power is present) or an indication of which of the multiple power-present power levels the signal power in the communication path corresponds to. The multiple power-present power levels can be indicated in any appropriate manner such as by digital number 01, 02, 03, etc. or by an analog signal.

The processor 302 can be configured to receive the signal from the signal sensor 304 indicating a power level of a signal propagating in the communication medium 110. In response to the signal, the processor 302 can store information indicative of the power level at that time (e.g., with an indication of a time to which the sensed power corresponds) in the associated memory 304. Instead of, or in addition to storing information, the processor 302 can send a signal over the PLM interface 216 to a network entity 101 (block 804). The signal can include an indication of the power level sensed by the signal sensor 306. The signal from the processor 302 to the network entity 101 can be sent immediately upon receiving a signal at the processor 302 from the signal sensor 306, or can be sent at a later time. The signal can be initiated by the processor 302, or can be in response to a signal from the network entity 101.

Communication between a network entity 101 and a processor 302 of a connector 102 can occur through any appropriate means. An example communication means includes sending read and write requests over the PLM interface 108/216 from the network entity 101 to the processor 302 to obtain information from and provide information to the processor 302. In such an example, the processor 302 can emulate a storage device and can provide information to the network entity 101 in response to a read request and can store information in its associate storage device 304 in response to a write request. Another example communication means includes using the I2C communication protocol. Examples of such communication means between a network entity 101 and a processor 302 are provided in the other patent applications identified and incorporated by reference herein.

In any case, the processor 302 can provide information indicative of the power level sensed by the signal sensor 306 to the network entity 101. The network entity 101 can use the power-level information locally and/or can send the power-level information to another device over the network 156 (block 806). For example, the network entity 101 can send the power-level information to the aggregation point 152. Other information can also be included with the power-level information such as the time to which the power-level information corresponds, identification information for the communication media 110 from which the power-level information was obtained, identification of the network entity 101 and/or port thereof to which the communication media 110 is connected, and/or other information.

The power-level information can be used to determine whether communication signals are properly propagating through the corresponding communication medium 110 (block 808). For example, in response to receiving the power-level information, the network entity 101 and/or aggregation point 152 can analyze the information to determine whether signals are properly propagating through the corresponding communication medium 110. The determination as to whether signals are properly propagating through the communication medium 110 can be made in any appropriate manner. For example, the power-level information can be compared with an expected power level. If the power-level information is lower than a lowest expected power level, a determination can be reached that signals are not properly propagating through the communication medium 110. The expected power level can be obtained from a priori information indicating the proper power level of signals in the communication medium 110 and/or can incorporate information such as whether signals were being sent over the communication medium 110 at that time. The determination as to whether signals are properly propagating through the communication medium 110 can be made based on a single power-level reading, or can be made based on multiple power-level readings over time. Moreover, there can be multiple levels of degraded signals used, such that the determination as to whether signals are properly propagating can include a determination as to which of the multiple levels of degraded signals are present. For example, level 0 can indicate that no communication signals are propagating through the communication medium 110, level 1 can indicate some communication signals are propagating, level 2 can indicate that most signals are properly propagating, and level 3 can indicate that all signals are properly propagating.

If the network entity 101 and/or aggregation point 152 determines that signals are not properly propagating (e.g., are degraded in any way or are degraded to a threshold level), the network entity 101 and/or aggregation point 152 can take appropriate action based on the determination (block 810). Such action can include generating an alert to a technician, increased or maintained monitoring of the communication medium 110, routing of communication signals to avoid the communication medium 110, and/or other actions.

In some examples, the determination as to whether signals are properly propagating can be made based on power-level readings from both ends of a communication medium 110. For example, a first signal sensor 306 in a first connector 102 on a first end of the communication medium 110 can obtain a first one or more power-level readings and provide information based thereon to a first processor 302 in the first connector 102. The first processor 302 can send first power-level information on the first one or more power-level readings to a first network entity 101 to which the first connector 102 is connected. A second signal sensor 306 in a second connector 102 on a second end of the communication medium 110 can obtain second one or more power-level readings to provide information based thereon to a second processor 302 in the second connector 102. The second processor 302 can send second power-level information on the second one or more power-level readings to a second network entity 101 to which the second connector 102 is connected. The first power-level information and the second power-level information can be aggregated to determine whether signals are properly propagating through the communication medium 110. The first-power level information and second power-level information can be aggregated in the first network entity 101, the second network entity 101, another network entity, and/or the aggregation point 152. PLM information can be used to determine that the first power-level information and the second power-level information were obtained from different ends of a common communication medium 110. For example, PLM information can be used to associate a first port 104 to which the first connector 102 is connected with a second port 104 to which the second connector 102 is connected. The first and second power-level information can also be associated with the respective ports 104. In addition to, or instead of making the association via the first and second ports 104, the first and second power-level information can be associated directly with an identifier and/or sub-identifiers for the communication medium 110. Other manners of using PLM information are also possible.

In an example, the first and second power-level information can be used to distinguish a direction of a signal through the communication medium 110. For example, two power-level readings obtained at times corresponding to the length of time of propagation of the signal from one end to the other end of the communication medium 110 (e.g., it may be assumed that the time in which the signal is at both ends is the same), can be used to determine the direction in which the signal was traveling. Since the signal will decrease in power from the end in which it was transmitted into to the end from which it propagates out of, the power-level reading of the two having the higher power can be determined to be the end in which the signal was transmitted into. The other end would then be the end in which is transmitted out of Once determined, the direction of travel of the signal can be used in any appropriate manner, such as using the direction of the signal to determine the lowest expected power level in the determination as to whether the power level is below the lowest expected power level. Notably, the lowest expected power level for a signal at the transmitting end of the communication medium 110 for that signal can be higher than the lowest expected power level for a signal at the receiving end of the communication medium 110.

In some examples, one or more of the signal sensors 306 themselves can distinguish a direction in which a signal is propagating through a corresponding communication medium 110. Such a signal sensor 306 could distinguish between signals propagating in different directions by, for example, being angled within the communication medium 110 with respect to the path of the signals (e.g., toward one direction and away from the other), or by using the refractive index and total internal reflection properties of the communication medium 110 (in a fiber optic cable example) such that the signal sensor 306 senses light in only one of the directions or significantly reduces the light sensed from the other direction such that light coming from the other direction can be identified based on the low power level. Other examples of such a signal sensor 306 are also possible. If the direction in which the signal sensor 306 senses light is known a priori, this direction can be taken into account by the processor 302 and/or aggregation point 152 to utilize the direction information for a power-level reading.

Advantageously, the existing PLM interface, and the existing mechanism of obtaining and aggregating information from a connector 102 of a communication medium 110 can be utilized in the manners described herein to provide visibility to the power-level of signals propagating through one or more communication mediums 110. In some examples, network entities 101 and aggregating point 152 do not need additional hardware, and may not need additional software to obtain the power-level information. Accordingly, switching one or more existing communication mediums 110 in a PLM equipped system 100 with communication mediums 110 equipped with the functionality described herein may enable visibility to the power-level of the signals propagating through those communication mediums 110 as described herein. This can be especially advantages for connections of communication mediums 110 to a patch panel. Using the processes described herein at a PLM equipped patch panel can provide visibility to the power of signals propagating in communication mediums 110 attached to a patch panel.

In an example, the aggregation point 152 can be configured to aggregated the power-level information from various network entities 101 and maintain a link power-level database of the system 100. The link power-level database can provide a centralized location in which a network entity, the aggregation point 152, another entity, and/or a system manager can obtain information regarding the managed links in the system 100. In some examples, the aggregation point 152 can repeatedly (e.g., periodically) poll each of the managed network entities 101 in the system 100 to obtain updated power-level information (possibly along with other PLM information) regarding the connectors 102/communication mediums 110 connected thereto. Communication between the aggregation point 152 and network entities 101 can occur through any appropriate means including through a layer 2 SNMP request (e.g., a request for a MIB). Examples of communication means between an aggregation point 152 and network entity 101 are provided in the other patent applications identified and incorporated by reference herein.

A centralized management center (e.g., the same management center used for other PLM information) can be used to provide alerts to a system manager regarding a change in state (expected and/or unexpected) of a power-level of a link in the system 100. For example, the centralized management center can indicate that a link power is below or has dropped below a threshold, is above or has risen above a threshold, has changed to a functioning (i.e., signals are properly propagating), partially functioning (i.e., signals are degraded), or non-functioning (i.e., signals are not properly propagating) state, and/or that a change in power-level for a link has occurred unexpectedly. An unexpected change can include a change in a link that is not scheduled for maintenance.

A network entity 101 can request power-level information (possibly in addition to other PLM information) from one or more connectors 102 connected to respective ports 104 thereof in response to a request from another entity (e.g., the aggregation point 152) or can request the power-level information for other reasons. These other reasons can include maintaining a local power-level database (e.g., for providing to the aggregation point 152). In some examples, the processor 302 in a connector 102 can be configured to provide power-level information to the network entity 101 or cause the network entity 101 to request power-level information from the connector 102 without having received a corresponding request signal from the network entity 101. That is, the processor 302 can push the power-level information to the network entity 101. In an implementation of this example, the processor 302 can push the power-level information on a periodic basis to keep the network entity 101 informed of the current power-level. In another implementation of this example, the processor 302 can provide reduced or no pushes of power-level information if the power-level of the signals are within an expected range (e.g., above a threshold), and can provide increased pushes of power-level information if the power-level of the signals is outside of the expected range. In an example, the fourth previously unused contact of the four-contact PLM interface 216 described with respect to FIG. 4 can be used as an interrupt line for the processor 302 to interrupt the network entity 101 to push power-level (and possibly other information) thereto. The network entity 101 can operate similarly to any of the above manners to push information to the aggregation point 152 regardless of how or whether the processor 302 is pushing information to the network entity 101.

In some examples, the network entity 101 or another entity can use the power-level information to analyze a transmitter/receiver (e.g., an optical transceiver) to determine whether the transmitter/receiver is operating properly. For example, the network entity 101 can use the power-level information to analyze launch and receive power of an optical transmitter/receiver.

In some examples, the processor 302 can be configured to send commands or data to the associated signal sensor 306 to adjust a parameter of operation of the signal sensor 306. For example, if the signal sensor 306 has the capability, the processor 302 could send calibration values to adjust operation of the sensor 306. Such a command can be initiated by the processor 302 or can be in response to a command from a network entity 101.

In an example, the aggregation point 152 can communicate through the network entity 101 to the processor 302 to cause the processor 302 to control the one or more LEDs 702, if present, to indicate a change request (e.g., move/replace) for the connector 102.

Further details, embodiments, and implementations can be found in the following United States patent applications, all of which are hereby incorporated herein by reference:

U.S. Provisional Patent Application Ser. No. 61/152,624, filed on Feb. 13, 2009, titled "MANAGED CONNECTIVITY SYSTEMS AND METHODS" (also referred to here as the "'624 application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 application); U.S. patent application Ser. No. 12/705,514, filed on Feb. 12, 2010, titled "MANAGED CONNECTIVITY DEVICES, SYSTEMS, AND METHODS" (also referred to here as the '514 application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 application"); U.S. Provisional Patent Application Ser. No. 61/303,961, filed on Feb. 12, 2010, titled "FIBER PLUGS AND ADAPTERS FOR MANAGED CONNECTIVITY" (the "'961 application"); and U.S. Provisional Patent Application Ser. No. 61/303,948, filed on Feb. 12, 2010, titled "BLADED COMMUNICATIONS SYSTEM" (the "'948 application"); U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS"; U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM"; U.S. Provisional Patent Application Ser. No. 61/467,725, filed on Mar. 25, 2011, titled "DYNAMICALLY DETECTING A DEFECTIVE CONNECTOR AT A PORT"; U.S. Provisional Patent Application Ser. No. 61/467,729, filed on Mar. 25, 2011, titled "IDENTIFIER ENCODING SCHEME FOR USE WITH MULTI-PATH CONNECTORS"; U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS"; and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

Example Embodiments

Example 1 includes a communication media comprising: one or more communication paths extending from a first end to a second end; a first connector assembly terminating the first end of the one or more communication paths, the first connector assembly including a first physical layer management (PLM) interface that is isolated from signals on the one or more communication paths, the first connector assembly including: a first signal sensor configured to sense signal power propagating through the first connector assembly to/from the one or more communication paths; a first programmable processor coupled to the first signal sensor and to the first PLM interface; and one or more first data storage devices, the one or more first data storage devices including first instructions which, when executed by the first programmable processor, cause the first programmable processor to receive a first signal from the first signal sensor corresponding to the signal power detected by the first signal sensor, and to send a first indication of the first signal power propagating through the first connector assembly, the first programmable processor configured to send the first indication over the first PLM interface to a first network entity.

Example 2 includes the communication media of Example 1, wherein the first instructions cause the first programmable processor to include in the first indication whether or not the signal sensor detected signal power in the first connector assembly at a first time.

Example 3 includes the communication media of any of Examples 1-2, wherein the first instructions cause the first programmable processor to include in the first indication a power level of the signal power detected in the first connector assembly, wherein the power level is one of multiple power-present power levels.

Example 4 includes the communication media of any of Examples 1-3, whereby one of the first network entity, another network entity, or an aggregation point can determine whether signals are propagating from the second end to the first end of the communication media based on the first indication.

Example 5 includes the communication media of any of Examples 1-4, wherein the first instructions cause the first programmable processor to: receive a command over the first PLM interface instructing the first programmable processor to adjust a parameter of the first signal sensor; and send a signal to the first signal sensor to adjust the parameter in response to the command.

Example 6 includes the communication media of any of Examples 1-5, wherein the first network entity includes one of an active optical module, a patch panel, a switch, a router, or other network entity.

Example 7 includes the communication media of any of Examples 1-6, wherein the first signal sensor is an optical sensor configured to sense light energy propagating through the first connector assembly to/from the one or more communication paths.

Example 8 includes the communication media of any of Examples 1-6, wherein the first signal sensor is an electromagnetic sensor configured to sense electromagnetic energy propagating through the first connector assembly to/from the one or more communication paths.

Example 9 includes the communication media of any of Examples 1-8, wherein the first instructions cause the first programmable processor to monitor the power level of the signals in the first connector assembly and to send an alert to the first network entity in response to the power level dropping below a threshold.

Example 10 includes the communication media of any of Examples 1-9, wherein the first instructions cause the first programmable processor to provide PLM information to the first network entity, whereby an aggregation point can associate a first port on the first network entity to which the first connector assembly is inserted with the first connector assembly or the communication media using the PLM information.

Example 11 includes the communication media of any of Examples 1-10, comprising: a second connector assembly terminating the second end of the one or more communication paths, the second connector assembly including a second physical layer management (PLM) interface that is isolated from signals on the one or more communication paths, the second connector assembly including: a second signal sensor configured to sense signal power propagating through the second connector assembly to/from the one or more communication paths; a second programmable processor coupled to the second signal sensor and to the second PLM interface; and one or more second data storage devices, the one or more second data storage devices including second instructions which, when executed by the second programmable processor, cause the second programmable processor to receive a second signal from the second signal sensor corresponding to the signal power detected by the second signal sensor, and to send a second indication of the second signal power propagating through the second connector assembly, the second programmable processor configured to send the second indication over the second PLM interface to a second network entity, whereby an aggregation point can determine whether signals are propagating over the one or more communication paths between the first end and the second end based on the first indication and the second indication.

Example 12 includes the communication media of any of Examples 9-11, wherein the first instructions cause the first programmable processor to provide PLM information to the first network entity, wherein the second instructions cause the second programmable processor to provide PLM information to the second network entity, whereby an aggregation point can associate a first port on the first network entity to which the first connector assembly is inserted with a second port to which the second connector assembly is inserted based on the PLM information provided by the first and second programmable processors.

Example 13 includes the communication media of any of Examples 1-12, wherein the first signal sensor and the first programmable processor obtain operating power over the PLM interface.

Example 14 includes a system comprising: a first network entity having a first port; an aggregation point in communication with the first network entity over a network; a cable assembly including: one or more communication paths extending from a first end to a second end; a first connector terminating the first end of the one or more communication paths, the first connector connected to the first port, wherein the first connector includes a first physical layer management (PLM) interface that is isolated from signals on the one or more communication paths, the first connector including: a first signal sensor configured to sense power of a communication signal propagating through the first connector; a first programmable processor coupled to the first signal sensor and to the first PLM interface; and one or more first data storage devices, the one or more first data storage devices including first instructions which, when executed by the first programmable processor, cause the first programmable processor to receive a first signal from the first signal sensor corresponding to the signal power detected by the first signal sensor, and to send a first indication of the first signal power propagating through the first connector over the first PLM interface to the first network entity; wherein the first network entity is configured to send first information based on the first indication to the aggregation point, wherein the aggregation point is configured to determine whether signals are propagating from the second end to the first end of the cable assembly based on the first information.

Example 15 includes the system of Example 14, comprising: a second network entity having a second port, wherein the aggregation point is in communication with the second network entity over the network; wherein the cable assembly includes: a second connector terminating the second end of the one or more communication paths, the second connector connected to the second port, wherein the second connector includes a second physical layer management (PLM) interface that is isolated from signals on the one or more communication paths, the second connector including: a second signal sensor configured to sense power of a communication signal propagating through the second connector; a second programmable processor coupled to the second signal sensor and to the second PLM interface; and one or more second data storage devices, the one or more second data storage devices including second instructions which, when executed by the second programmable processor, cause the second programmable processor to receive a second signal from the second signal sensor corresponding to the signal power detected by the second signal sensor, and to send a second indication of the second signal power propagating through the second connector over the second PLM interface to the second network entity; wherein the second network entity is configured to send second information based on the second indication to the aggregation point, wherein the aggregation point is configured to determine whether signals are propagating from the first end to the second end of the cable assembly based on the second information.

Example 16 includes the system of Example 15, wherein the first instructions cause the first programmable processor to provide first PLM information identifying one of the first connector or the cable assembly to the first network entity, wherein the first network entity provides third information based on the first PLM information to the aggregation point, wherein the first network entity provides fourth information identifying the first port to the aggregation point, and indicating that the third information corresponds to a cable assembly connected to the first port, wherein the second instructions cause the second programmable processor to provide second PLM information identifying one of the second connector or the cable assembly to the second network entity, wherein the second network entity provides fifth information based on the second PLM information to the aggregation point, wherein the second network entity provides sixth information identifying the second port to the aggregation point, and indicating that the fifth information corresponds to a cable assembly connected to the second port, wherein the aggregation point can associate the first port with the second port based on the third, fourth, fifth, and sixth information.

Example 17 includes the system of any of Examples 14-16, wherein the aggregation point is configured to receive multiple items of information, each indicating a signal power propagating through a respective connector of a cable assembly, and to maintain a link database indicating whether or not a plurality of communication links are functioning based on the items of information.

Example 18 includes the system of Example 17, wherein the aggregation point is configured to generate an alert in response to any of the communication links switching to a non-functioning state unexpectedly.

Example 19 includes the system of any of Examples 17-18, wherein the aggregation point is configured to repeatedly poll a plurality of network entities to monitor the signal power propagating through respective connectors coupled to the network entities in order to maintain the link database.

Example 20 includes the system of Example 19, wherein in response to receiving a poll from the aggregation point, each of the plurality of network entities is configured to request updated signal power information from a programmable processor in each PLM managed connector connected to a PLM managed port of the respective network entity.

Example 21 includes a method of monitoring a signal power propagating through a cable assembly, the method comprising: sensing from within the cable assembly a first power of a first signal propagating through a first connector of the cable assembly, the first signal propagating to/from one or more communication paths of the cable assembly; and sending a first signal indicative of the first power from the cable assembly to a first network entity.

Example 22 includes the method of Example 21, wherein sending a first signal includes sending the first signal over a first PLM interface of the cable assembly to the first network entity.

Example 23 includes the method of any of Examples 21-22, wherein sensing includes sensing whether or not signal power is present in the first connector assembly at a first time, wherein sending the first signal includes sending a first signal indicating whether or not signal power is present at the first time.

Example 25 includes the method of any of Examples 21-23, comprising: determining at one of the first network entity, another network entity, or an aggregation point, whether signals are propagating from a second end of the cable assembly to a first end of the cable assembly based on the signal from the cable assembly, wherein the first connector is at the first end of the cable assembly.

Example 25 includes the method of any of Examples 21-25, comprising: distinguishing between a signal propagating in a first direction through the cable assembly and a signal propagating in a second direction through the cable assembly.

Example 26 includes the method of any of Examples 21-25, wherein sensing includes sensing light energy propagating through the first connector.

Example 27 includes the method of any of Examples 21-25, wherein sensing includes sensing electromagnetic energy propagating through the first connector.

Example 28 includes the method of any of Examples 21-27, comprising: monitoring from within the cable assembly the power level of signals in the first connector assembly; and sending an alert from the cable assembly to the first network entity in response to the power level dropping below a threshold.

Example 29 includes the method of any of Examples 21-28, comprising: sensing from within the cable assembly a second power of a second signal propagating through a second connector of the cable assembly, the second signal propagating to/from the one or more communication paths of the cable assembly; sending a second signal indicative of the second power from the cable assembly to a second network entity; and determining whether signals are propagating in both directions over the cable assembly based on the first signal and the second signal.

Example 30 includes the method of Example 29, comprising: sending first PLM information from the first connector to the first network entity; sending second PLM information from the second connector to the second network entity; sending the first PLM information from the first network entity to an aggregation point; sending the second PLM information from the second network entity to the aggregation point; and associating a first port on the first network entity to which the first connector is inserted with a second port on the second network entity to which the second connector is inserted based on the first and second PLM information.

Example 31 includes the method of any of Examples 21-30, comprising: receiving a command at the cable assembly from the first network entity to adjust a parameter for sensing signals propagating through the first connector; and adjusting the parameter in response to the command.

Example 32 includes the method of any of Examples 21-31, comprising: monitoring a plurality of communication links based on signals from a respective sensor included within a respective cable assembly corresponding to each of the plurality communication links; and generating an alert in response to any of the plurality of communication links switching to a non-functioning state unexpectedly.

Example 33 includes the method of any of Examples 21-32, comprising: repeatedly polling the cable assembly to monitor signal power propagating through the first connector over time.

The invention claimed is:

1. A communication media comprising:
one or more communication paths extending from a first end to a second end; and
a first connector assembly terminating the first end of the one or more communication paths, the first connector assembly including a first physical layer management (PLM) interface that is isolated from signals on the one or more communication paths, the first connector assembly including:
a first signal sensor configured to sense signal power propagating through the first connector assembly to/from the one or more communication paths;
a first programmable processor coupled to the first signal sensor and to the first PLM interface; and
one or more first data storage devices, the one or more first data storage devices including first instructions which, when executed by the first programmable processor, cause the first programmable processor to receive a first signal from the first signal sensor corresponding to the signal power detected by the first signal sensor, and to send a first indication of the first signal power propagating through the first connector assembly, the first programmable processor configured to send the first indication over the first PLM interface to a first network entity.

2. The communication media of claim 1, wherein the first instructions cause the first programmable processor to include in the first indication whether or not the signal sensor detected signal power in the first connector assembly at a first time.

3. The communication media of claim 1, wherein the first instructions cause the first programmable processor to include in the first indication a power level of the signal power detected in the first connector assembly, wherein the power level is one of multiple power-present power levels.

4. The communication media of claim 1, whereby one of the first network entity, another network entity, or an aggregation point can determine whether signals are propagating from the second end to the first end of the communication media based on the first indication.

5. The communication media of claim 1, wherein the first instructions cause the first programmable processor to:
receive a command over the first PLM interface instructing the first programmable processor to adjust a parameter of the first signal sensor; and
send a signal to the first signal sensor to adjust the parameter in response to the command.

6. The communication media of claim 1, wherein the first network entity includes one of an active optical module, a patch panel, a switch, a router, or other network entity.

7. The communication media of claim 1, wherein the first signal sensor is an optical sensor configured to sense light energy propagating through the first connector assembly to/from the one or more communication paths.

8. The communication media of claim 1, wherein the first signal sensor is an electromagnetic sensor configured to sense electromagnetic energy propagating through the first connector assembly to/from the one or more communication paths.

9. The communication media of claim 1, wherein the first instructions cause the first programmable processor to monitor the power level of the signals in the first connector assembly and to send an alert to the first network entity in response to the power level dropping below a threshold.

10. The communication media of claim 9, wherein the first instructions cause the first programmable processor to provide PLM information to the first network entity; and
wherein the second instructions cause the second programmable processor to provide PLM information to the second network entity, whereby an aggregation point can associate a first port on the first network entity to which the first connector assembly is inserted with a second port to which the second connector assembly is inserted based on the PLM information provided by the first and second programmable processors.

11. The communication media of claim 1, wherein the first instructions cause the first programmable processor to provide PLM information to the first network entity,
whereby an aggregation point can associate a first port on the first network entity to which the first connector assembly is inserted with the first connector assembly or the communication media using the PLM information.

12. The communication media of claim 1, comprising:
a second connector assembly terminating the second end of the one or more communication paths, the second connector assembly including a second physical layer management (PLM) interface that is isolated from signals on the one or more communication paths, the second connector assembly including:
a second signal sensor configured to sense signal power propagating through the second connector assembly to/from the one or more communication paths;
a second programmable processor coupled to the second signal sensor and to the second PLM interface; and
one or more second data storage devices, the one or more second data storage devices including second instructions which, when executed by the second programmable processor, cause the second programmable processor to receive a second signal from the second signal sensor corresponding to the signal power detected by the second signal sensor, and to send a second indication of the second signal power propagating through the second connector assembly, the second programmable processor configured to send the second indication over the second PLM interface to a second network entity, whereby an aggregation point can determine whether signals are propagating over the one or more communication paths between the first end and the second end based on the first indication and the second indication.

13. The communication media of claim 1, wherein the first signal sensor and the first programmable processor obtain operating power over the PLM interface.

14. A system comprising:
a first network entity having a first port;
an aggregation point in communication with the first network entity over a network;
a cable assembly including:
one or more communication paths extending from a first end to a second end;
a first connector terminating the first end of the one or more communication paths, the first connector connected to the first port, wherein the first connector includes a first physical layer management (PLM) interface that is isolated from signals on the one or more communication paths, the first connector including:
a first signal sensor configured to sense power of a communication signal propagating through the first connector;
a first programmable processor coupled to the first signal sensor and to the first PLM interface; and
one or more first data storage devices, the one or more first data storage devices including first instructions which, when executed by the first programmable processor, cause the first programmable processor to receive a first signal from the first signal sensor corresponding to the signal power detected by the first signal sensor, and to send a first indication of the first signal power propagating through the first connector over the first PLM interface to the first network entity;
wherein the first network entity is configured to send first information based on the first indication to the aggregation point; and
wherein the aggregation point is configured to determine whether signals are propagating from the second end to the first end of the cable assembly based on the first information.

15. The system of claim 14, comprising:
a second network entity having a second port, wherein the aggregation point is in communication with the second network entity over the network;
wherein the cable assembly includes:
a second connector terminating the second end of the one or more communication paths, the second connector connected to the second port, wherein the second connector includes a second physical layer management (PLM) interface that is isolated from signals on the one or more communication paths, the second connector including:
a second signal sensor configured to sense power of a communication signal propagating through the second connector;
a second programmable processor coupled to the second signal sensor and to the second PLM interface; and
one or more second data storage devices, the one or more second data storage devices including second instructions which, when executed by the second programmable processor, cause the second programmable processor to receive a second signal from the second signal sensor corresponding to the signal power detected by the second signal sensor, and to send a second indication of the second signal power propagating through the second connector over the second PLM interface to the second network entity;
wherein the second network entity is configured to send second information based on the second indication to the aggregation point; and wherein the aggregation point is configured to determine whether signals are propagating from the first end to the second end of the cable assembly based on the second information.

16. The system of claim 15, wherein the first instructions cause the first programmable processor to provide first PLM information identifying one of the first connector or the cable assembly to the first network entity,
wherein the first network entity provides third information based on the first PLM information to the aggregation point,
wherein the first network entity provides fourth information identifying the first port to the aggregation point, and indicating that the third information corresponds to a cable assembly connected to the first port,
wherein the second instructions cause the second programmable processor to provide second PLM information identifying one of the second connector or the cable assembly to the second network entity,
wherein the second network entity provides fifth information based on the second PLM information to the aggregation point,
wherein the second network entity provides sixth information identifying the second port to the aggregation point, and indicating that the fifth information corresponds to a cable assembly connected to the second port, and
wherein the aggregation point can associate the first port with the second port based on the third, fourth, fifth, and sixth information.

17. The system of claim 14, wherein the aggregation point is configured to receive multiple items of information, each indicating a signal power propagating through a respective connector of a cable assembly, and to maintain a link database indicating whether or not a plurality of communication links are functioning based on the items of information.

18. The system of claim 17, wherein the aggregation point is configured to generate an alert in response to any of the communication links switching to a non-functioning state unexpectedly.

19. The system of claim 17, wherein the aggregation point is configured to repeatedly poll a plurality of network entities to monitor the signal power propagating through respective connectors coupled to the network entities in order to maintain the link database.

20. The system of claim 19, wherein in response to receiving a poll from the aggregation point, each of the plurality of network entities is configured to request updated signal power information from a programmable processor in each PLM managed connector connected to a PLM managed port of the respective network entity.

21. A method of monitoring a signal power propagating through a cable assembly, the method comprising:
sensing from within the cable assembly a first power of a first signal propagating through a first connector of the cable assembly, the first signal propagating to/from one or more communication paths of the cable assembly; and
sending a first signal indicative of the first power from the cable assembly to a first network entity.

22. The method of claim 21, wherein sending a first signal includes sending the first signal over a first PLM interface of the cable assembly to the first network entity.

23. The method of claim 21, wherein sensing includes sensing whether or not signal power is present in the first connector assembly at a first time, and wherein sending the first signal includes sending a first signal indicating whether or not signal power is present at the first time.

24. The method of claim 21, further comprising determining at one of the first network entity, another network entity, or an aggregation point, whether signals are propagating from a second end of the cable assembly to a first end of the cable assembly based on the signal from the cable assembly, wherein the first connector is at the first end of the cable assembly.

25. The method of claim 21, further comprising distinguishing between a signal propagating in a first direction through the cable assembly and a signal propagating in a second direction through the cable assembly.

26. The method of claim 21, wherein sensing includes sensing light energy propagating through the first connector.

27. The method of claim 21, wherein sensing includes sensing electromagnetic energy propagating through the first connector.

28. The method of claim 21, further comprising:
monitoring from within the cable assembly the power level of signals in the first connector assembly; and
sending an alert from the cable assembly to the first network entity in response to the power level dropping below a threshold.

29. The method of claim 21, further comprising:
sensing from within the cable assembly a second power of a second signal propagating through a second connector of the cable assembly, the second signal propagating to/from the one or more communication paths of the cable assembly;
sending a second signal indicative of the second power from the cable assembly to a second network entity; and
determining whether signals are propagating in both directions over the cable assembly based on the first signal and the second signal.

30. The method of claim 29, further comprising:
sending first PLM information from the first connector to the first network entity; sending second PLM information from the second connector to the second network entity;
sending the first PLM information from the first network entity to an aggregation point;
sending the second PLM information from the second network entity to the aggregation point; and
associating a first port on the first network entity to which the first connector is inserted with a second port on the second network entity to which the second connector is inserted based on the first and second PLM information.

31. The method of claim 21, further comprising:
receiving a command at the cable assembly from the first network entity to adjust a parameter for sensing signals propagating through the first connector; and
adjusting the parameter in response to the command.

32. The method of claim 21, further comprising:
monitoring a plurality of communication links based on signals from a respective sensor included within a respective cable assembly corresponding to each of the plurality communication links; and
generating an alert in response to any of the plurality of communication links switching to a non-functioning state unexpectedly.

33. The method of claim 21, further comprising repeatedly polling the cable assembly to monitor signal power propagating through the first connector over time.

* * * * *